No. 648,748. Patented May 1, 1900.
F. E. IVES.
CAMERA FOR COMPOSITE COLOR PHOTOGRAPHY.
(Application filed Jan. 15, 1900.)
(No Model.)
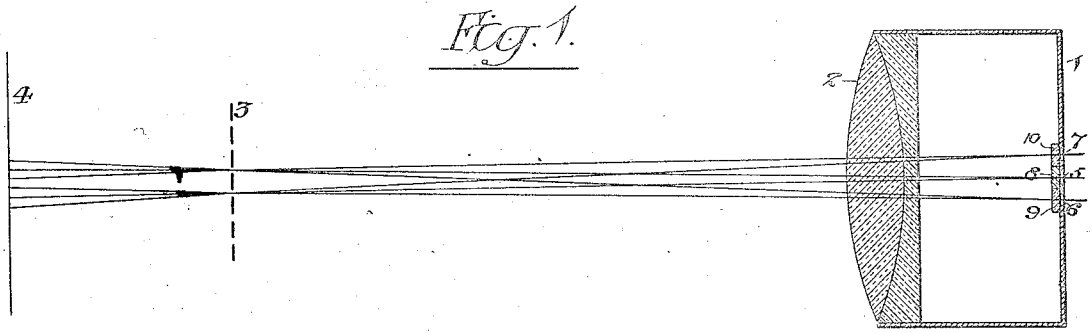
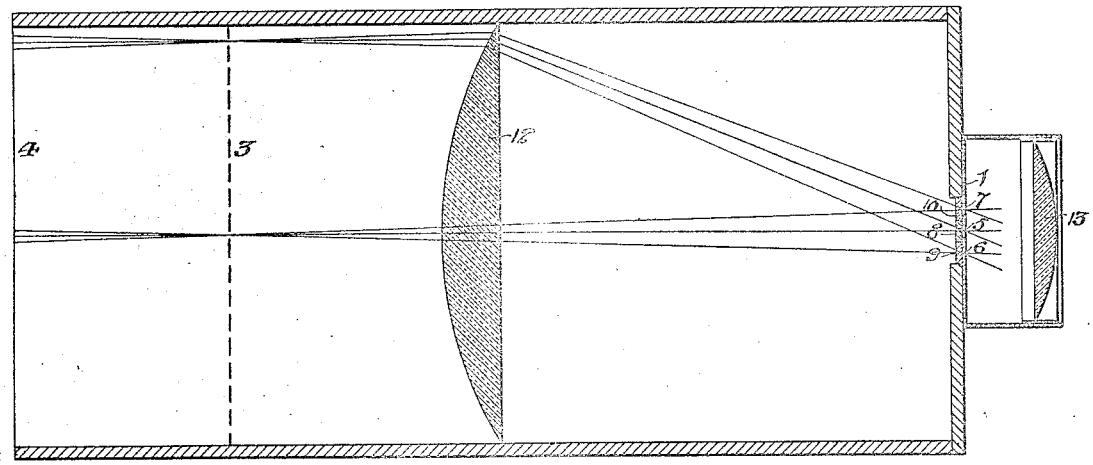
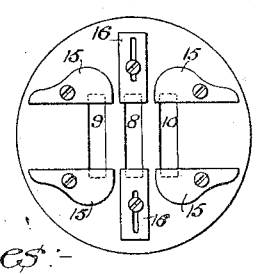 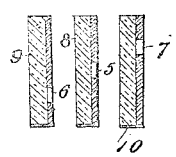 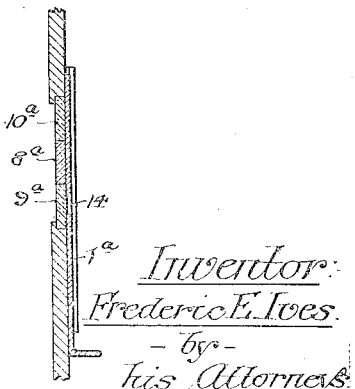
Witnesses:
Frank M. Graham.
Davis W. Whitehead
Inventor:
Frederic E. Ives.
— by —
his Attorneys.
Howson & Howson

UNITED STATES PATENT OFFICE.

FREDERIC E. IVES, OF PHILADELPHIA, PENNSYLVANIA.

CAMERA FOR COMPOSITE-COLOR PHOTOGRAPHY.

SPECIFICATION forming part of Letters Patent No. 648,748, dated May 1, 1900.

Application filed January 15, 1900. Serial No. 1,494. (No model.)

*To all whom it may concern:*

Be it known that I, FREDERIC E. IVES, a citizen of the United States, residing in Philadelphia, Pennsylvania, have invented certain Improvements in Cameras for Composite-Color Photography, of which the following is a specification.

My invention consists of an improvement in cameras intended for use in carrying out that method of composite-color photography in which the color record consists of a single image made up of juxtaposed lines representing the separate-color elements—as, for instance, a line for the red, one for the green, and one for the blue, then another line for the red, another for the green, and another for the blue, and so on across the entire width of the image.

The object of my invention is to provide a means for obtaining such color records without the necessity of using a screen ruled with successive series of red, green, and blue lines, or without the necessity of making successive exposures through a screen having alternating transparent and opaque lines, the screen being moved laterally after the first and second exposures to the extent of the width of the desired color-line in the picture and the color-screens being also changed between successive exposures.

In carrying out my invention I employ, in connection with a screen having alternate transparent and opaque lines, what I term "a party-colored-lens diaphragm," and I preferably expose all three colors simultaneously, although my invention may be carried out by exposing the different colors successively, as will be hereinafter explained.

In the accompanying drawings, Figure 1 is a diagram illustrating in an exaggerated way the essential features of my invention. Fig. 2 is a similar diagram illustrating another means which may be employed for carrying out the invention. Fig. 3 is a view illustrating a multiple-apertured diaphragm with means for varying the area of its apertures, and Figs. 4 and 5 are views illustrating different forms of diaphragm structures from that shown in the other figures of the drawings.

In Fig. 1 the party-colored diaphragm is represented at 1, the objective lens at 2, the screen having alternate transparent and opaque lines at 3, and the sensitive plate or focal plane of the camera at 4.

The diaphragm 1 has three parallel apertures 5, 6, and 7 located side by side, these apertures in the present instance being in the form of oblong rectangular slits and each being provided with its appropriate color-screen 8, 9, or 10. Thus the center screen 8 may be green, one outer screen 9 may be red, and the other outer screen 10 may be blue.

It should be understood, of course, that the drawing is simply diagrammatic, no attempt being made to observe the proper proportions of the parts.

In practice approximately the following proportions are recommended: The party-colored diaphragm may have slots about three-eighths of an inch long and one-sixteenth of an inch in width, the centers of the slots being nearly five thirty-seconds of an inch apart, and this diaphragm being placed about one inch in advance of a plano-convex achromatic objective lens of about five and a half inches focus, which is at the focal distance from the plane 4, the screen 3 being located about one-eighth of an inch in advance of said focal plane 4.

The clear or transparent lines of the screen 3 should be somewhat less than one-third as wide as the opaque spaces, the number of transparent lines employed depending upon the desired number of lines which it is desired to form upon the sensitive plate.

With the parts arranged as shown the ground-glass plate located at the focal plane 4 will show an image which when magnified will be seen to be made up of successive series of juxtaposed color-lines—say a red line, a green line, and a blue, if these are the colors of the diaphragm-screens—there being as many of these sets of color-lines as there are transparent lines in the screen 3, owing to the fact that a ray of light from each of the apertures of the diaphragm passes through each of the transparent lines of the screen. The apertures of the diaphragm being exactly alike and equidistantly spaced, each of the color-lines visible upon the ground glass should be equidistant from the others and fairly-well defined, but shaded at the edges owing to the fact that the illumination is greatest at the center of each line.

As it is desirable for the purposes of this invention to be able to make negatives having a definite predetermined number of lines to the inch and as the coming of the rays from the lens to the plates will spread the lines farther apart at the focal plane than at the screen 3, said screen will have to be ruled somewhat finer than the desired fineness of the lines on the plate, this variation depending upon the distance at which the screen is set in advance of the plate.

The camera is adjusted by first setting the screen 3 so far in advance of the focal plane of the camera as to give the required number of lines to the inch at such focal plane and then forming the diaphragm with its apertures so separated as to secure sufficiently-even spacing of the color-lines on the plate. This variation in the fineness of plate and screen will be unnecessary if I employ at the point 12, Fig. 2, an achromatic lens having a focus equal to the distance from the diaphragm 1 to the optical center of the lens, so as to parallelize corresponding rays from each of the apertures of the diaphragm and project them rearwardly through the transparent lines of the screen 3 onto the sensitive plate located at 4, which is the focal plane of the lens at 12. The said lens may be the image-forming lens, or the screen 3 and sensitive plate may be brought so closely to said lens that no image will be formed thereby unless another lens is employed in connection therewith—for instance, at 13, in Fig. 2—or both lenses may aid in forming the image, if desired. When but a single lens is employed at 12, it may be necessary to change the relation thereto of the screen 3 and sensitive plate when near objects are to be brought into focus on said sensitive plate; but when the lens is employed at 13 focusing may be effected by movement of this latter lens. As a properly-achromatic lens to be placed at 12 would, however, be expensive, I prefer in all cases to use the construction shown in Fig. 1; but in this case also it is preferable, in order to simplify the adjustments, to make the camera of fixed extension and to focus for varying distances by means of supplementary lenses in front of the party-colored diaphragm.

The relative positions of the objective lens and diaphragm may be altered without departing from the main feature of my invention. For instance, the lens may be placed in front of the diaphragm instead of behind it, in which case the focusing may be done by moving the lens to and fro in the optical axis, or the diaphragm may occupy a position between the elements of the compound objective lens. It will also be possible in accordance with my invention to employ a diaphragm having a single aperture and to make three successive exposures through said aperture, the diaphragm being moved laterally to the desired extent after each exposure and being used each time in connection with a different color-screen. For instance, in Fig. 4 I have shown a color-screen having three portions $8^a$, $9^a$, and $10^a$, which may be, respectively, green, red, and blue, and a diaphragm $1^a$, having a single aperture 14, which diaphragm may be moved laterally, so as to make first one exposure through the red screen, then another exposure through the green screen, and then a third exposure through the blue screen, such lateral movement of the diaphragm being much preferable to the lateral movement of the screen 3, which has been proposed, owing to the fact that the movement of the latter must be infinitesimal in extent, and the slightest departure from strict accuracy defeats the purpose intended, whereas the movements of the diaphragm can be much greater, and slight inaccuracy in extent of movement will not be attended with such a destructive result. I may also employ, if desired, three independent and successively-used diaphragms, each with its own color-screen, the diaphragms having apertures occupying different lateral positions, as shown in Fig. 5, so that the three successive exposures will be attended with the same result as a single exposure through the diaphragm having three apertures, and by the term "party-colored-lens diaphragm" I mean to include such series of diaphragms as well as a single diaphragm having a series of apertures, and also a diaphragm having multiples of the three apertures and color-screens.

If an orthochromatic sensitive plate is exposed to the image at the focal point 4 of the camera, a linear color record will be produced similar to those that have heretofore been produced by exposure through colored-line screens; but I effectually overcome all of the objections to such colored-line screens in the way of expense, difficulty of producing a screen of the proper colors and fineness, and the fugitive nature of the coloring mediums employed.

The area of one or more of the apertures of the diaphragm may be varied by suitable means. For instance, in Fig. 3 I have shown in connection with the apertures 9 and 10 a pair of swinging plates 15, which can be adjusted so as to cover more or less of the area of said apertures, and in connection with the aperture 8 I have shown sliding plates 16 for the same purpose.

Having thus described my invention, I claim and desire to secure by Letters Patent—

1. In a camera for composite-color photography, the combination of a party-colored lens-diaphragm with an objective lens, and a screen situated within the focal plane and having alternating transparent and opaque portions, substantially as specified.

2. In a camera for composite-color photography, the combination of a screen situated within the focal plane and presenting alternating transparent and opaque portions, an objective lens and a diaphragm having three separated apertures each with its appropriate color-screen, substantially as specified.

3. In a camera for composite-color photography, the combination of a screen situated within the focal plane and presenting alternate transparent and opaque portions, an objective lens, and a party-colored diaphragm, said parts being disposed to produce color records with a predetermined spacing of the lines differing in gage from the spacing of the transparent lines of the screen, substantially as specified.

4. In a camera for composite-color photography, the combination of a screen located within the focal plane and presenting alternate transparent and opaque portions, an objective lens, and a diaphragm structure having three color-screens and three apertures each aperture operating in connection with its respective color-screen and each occupying a relation to the optical axis different from that of the others, substantially as specified.

5. The combination in a camera for composite-color photography, of a screen located within the focal plane and presenting alternate opaque and transparent portions, an objective lens, and a diaphragm structure having three color-screens, and three apertures one for each color-screen, each aperture occupying a relation to the optical axis different from that of the others, and means for varying the area of one or more of the apertures, substantially as specified.

In testimony whereof I have signed my name to this specification in the presence of two subscribing witnesses.

FREDERIC E. IVES.

Witnesses:
F. E. BECHTOLD,
JOS. H. KLEIN.